Re. 24710
June 12, 1956     J. W. YOWELL ET AL     2,749,942
BELLOWS
Filed Dec. 26, 1952     2 Sheets—Sheet 1
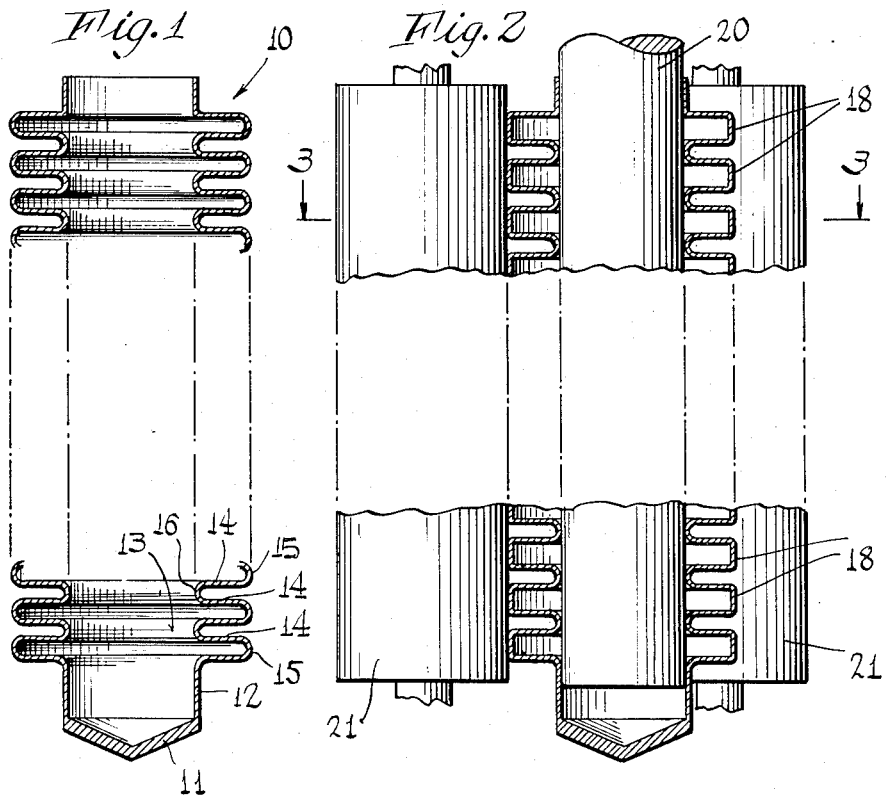
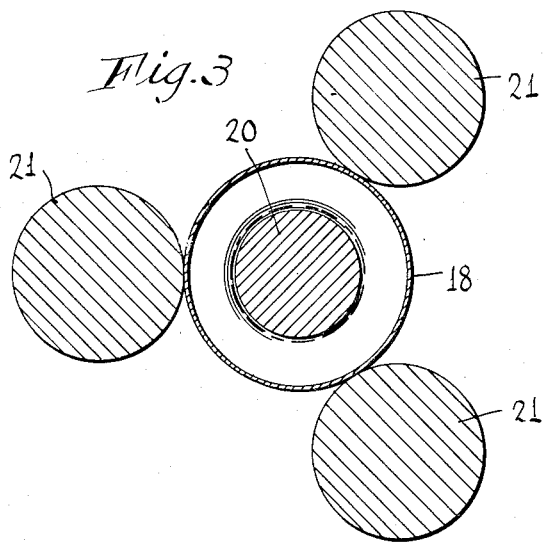
INVENTORS
Joseph W. Yowell
Donald B. Miner
BY Johnson and Kline
ATTORNEYS

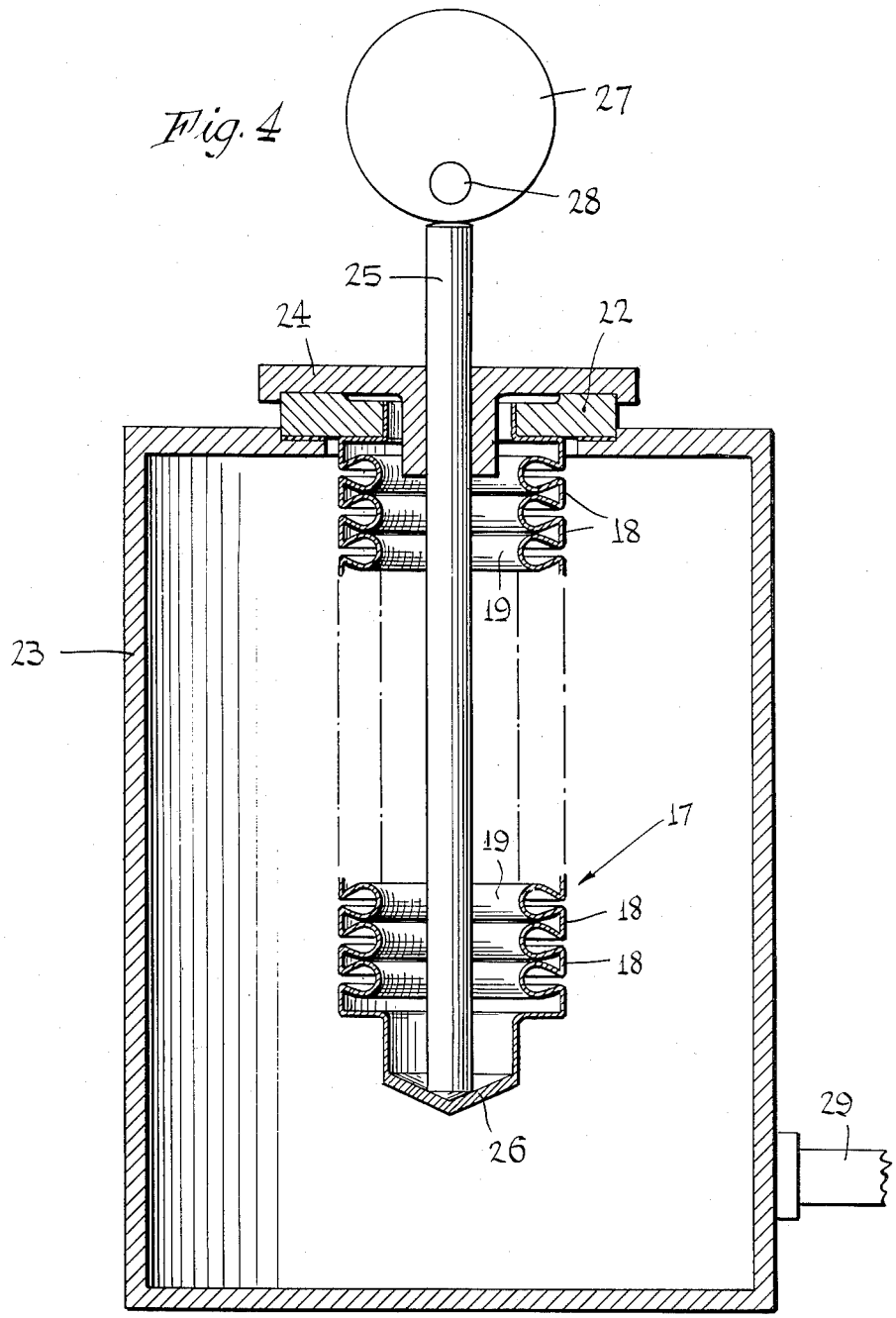

United States Patent Office 2,749,942
Patented June 12, 1956

2,749,942
BELLOWS

Joseph W. Yowell, Westport, and Donald B. Miner, Orange, Conn.

Application December 26, 1952, Serial No. 327,988

6 Claims. (Cl. 137—796)

This invention relates to bellows, and more particularly to metal bellows, including bellows adapted to be operated by fairly high fluid pressures in the range of fifty atmospheres or more.

Bellows of this class are commonly used in pressurized fluid systems involving control of hydraulic apparatus, fuel lines of jet aircraft engines and the like.

An object of the invention is to provide an improved metal bellows which is sensitive in its response to changes in fluid pressures and which is so organized and arranged that it can withstand pressures greatly in excess of those presently considered limiting for metal bellows of this class.

Another object of the invention is to provide an improved, sensitive metal bellows in which there is less likelihood of fatigue of the metal developing when the bellows is used with both moderate and high pressures.

Still another object of the invention is to provide an improved metal bellows as above set forth, which is simple and compact in its construction, and economical to fabricate.

A feature of the invention is the provision of an improved bellows as above set forth, in which the likelihood of permanent deformation and misadjustment of the bellows is minimized if not completely eliminated should the bellows be inadvertently subjected to over pressures above the intended operating range.

Other features and advantages will hereinafter appear.

In the accompanying drawings:

Figure 1 is an axial sectional view of a usual or conventional bellows having a wall contour characterized by reverse bends and by spaced coaxial wall sections connecting the bends, said wall sections lying generally in spaced radial planes.

Fig. 2 is a fragmentary axial sectional view of the bellows of Fig. 1 mounted on a mandrel and subjected to rollers for flattening the outer bends of the wall.

Fig. 3 is a transverse section taken on line 3—3 of Fig. 2.

Fig. 4 is a fragmentary axial view of the bellows of Fig. 3 mounted in a pressure chamber and having its radial walls bulged inward as provided by the invention to make it more sensitive and pressure-resistant.

The improved bellows and method of making the same, forming the subject matter of this invention, have particular utility in the control of fluid systems, particularly high pressure systems such as are encountered in aircraft and the like. Several such controls are illustrated and described in our copending application Serial No. 211,936, filed February 20, 1951, entitled Fluid Pressure Operated Control. The bellows used in the controls described in our aforesaid application and those which are disclosed by the instant invention are operative under variations if pressure is applied to the exterior of the bellows walls.

The method of the present invention contemplates reforming or working bellows having the conventional wall contour shown in Fig. 1, such bellows being at present commonly incorporated in fluid pressure operated controls and the like. The conventional bellows 10 shown in Fig. 1 is constituted all of one piece, having a closed end portion comprising a conical end wall 11 and a cylindrical wall 12 joining the wall 11 and the corrugated wall 13 of the bellows. The corrugated wall 13 comprises a plurality of spaced coaxial wall sections 14 lying in equispaced radial planes and joined together by reverse bends or outer and inner circular connector portions 15 and 16, the bends 15 being outermost and the bends 16 innermost. The bellows 10 may be made in any suitable manner well known to those skilled in the art.

In accordance with this invention the bellows 10 is re-worked or reformed to provide an improved bellows 17, Fig. 4, which retains the sensitivity of the bellows 10 but at the same time is adapted to withstand much greater working pressures. For example, if the working pressure of the bellows 10 is in the neighborhood of nine hundred pounds per square inch, the working pressure of the bellows 17 formed from the bellows 10 would be in the neighborhood of thirty-five hundred pounds per square inch.

It will be observed that the wall contour or section of the bellows 17 is quite different from that of the bellows 10, since it has a plurality of spaced, narrow flat juxtaposed annular bands 18 each band constituting a section of a cylinder and being aligned and coaxial with the other bands. The bands 18 may be thought of, and are hereinafter referred to, as wall portions having a radial depth equal to the wall thickness, since obviously they constitute segments of the bellows forming narrow sections of a cylinder wherein the radial depth of each section is actually the thickness of the cylinder wall. The corrugated wall of the bellows 17 has other annular portions 19 integral with, disposed within and connecting adjacent bands 18, each portion 19 having a cross section which is substantially circular and extends through an arc materially greater than 180 degrees.

In the bellows 10 each of the inner bends 16 of the corrugated wall 13 has a circular cross section extending through an arc of only 180 degrees, which is very materially less than the arc covered by the wall portions 19 of the bellows 17.

We have found that our improved bellows 17 shown in Fig. 4 has substantially the same sensitivity to changes in fluid pressure as the bellows 10 shown in Fig. 1, but is able to withstand pressures greatly in excess of the pressure considered the upper limit for the bellows 10. Thus, if as above mentioned the operating pressure of the bellows 10 is under nine hundred pounds per square inch, the operating pressure for the bellows 17 may be almost four times this value or up to thirty-five hundred pounds per square inch. This increase in the fluid pressure to which the bellows 17 may be safely subjected is attributed to the shape of the wall section, incorporating the flat cylindrical wall portions 18 and the circular wall portions 19. When the bellows 17 is subjected to external fluid pressure this pressure will be distributed in the folds of the bellows and will result in a tensile stress being set up in the wall portions 19. Such stress can be readily withstood by said wall portions as it is well known that resilient metal formations usually have their greatest strength in tension. When the bellows 17 shortens or elongates in response to the force of fluid pressure, the flexing accompanying said action will occur mainly in the inner wall sections 19 and will be uniform therein, and since said wall sections have a relatively great length, considering the section contour, the amount of actual flexing of any one small portion will not be materially greater than the flexing of the other portions. Accordingly there is less likelihood of fatigue of the material when the bellows is in operation, since the flexing will be well within the elastic limits of the material.

The points of small radii in the wall section, namely the junctions of the wall portions 18 and 19, will have less bending than the large radius portions 19 due to work hardening and stiffening of the material where the small radii occur. Instead, a bending of the wall portions 18 will be effected in response to high pressures, due mainly to the stiffening of the metal where the sharp bends are. Thus these portions will bulge or bow slightly outward when the bellows contracts.

It will be noted that the outer wall portions 18, being in alignment with each other, are enabled to touch and provide a buttressing effect which utilizes the strength of a column. This occurs prior to any permanent deformation of the bellows occurring, and accordingly the bellows is able to withstand considerable over pressures without loss of calibration or permanent deformation.

If a stop is used in conjunction with the bellows, to become operative when a determinately large pressure is experienced, the stop is preferably adjusted so that the adjacent convolutions of the bellows wall will not be brought into contact with each other, since we have found that the improved wall contour of the bellows of Fig. 4 is well able to withstand over pressures without relying on the buttressing effect above mentioned.

In following the method of the invention the bellows 10 shown in Fig. 1 may be placed on a mandrel 20 which closely fits the inside portions of the bellows wall 13. Rollers 21 are then advanced radially against the exterior of the bellows, to cause a flattening of the outer wall portions thereof, thus forming the narrow cylindrical bands 18. The bellows is then removed from the mandrel 20 and the open end soldered to a ring 22 which preferably constitutes the mounting for the bellows in the device of ultimate use. The ring 22 is clamped to the mouth of a container 23, with the bellows extending into the interior of the container. This may be advantageously done by means of a circular plate 24, said plate also constituting a bearing for a rod 25 which is extended into the bellows and engages the lowermost end wall 26 thereof. Engaging the outer end of the rod 25 is an eccentric or cam 27 carried on a shaft 28. The container 23 has a fluid connection 29 by which fluid may be introduced into the container under pressure. Prior to the introduction of pressure in the container 23 the bellows will be elongated and the rod 25 in a position lower than that shown, the cam 27 being correspondingly rotated from the position shown. Fluid is then introduced in the container 23 under pressure and the pressure increased, meanwhile the cam 27 being slowly rotated to enable the rod 25 to raise as the bellows 17 contracts. With a proper correlation between the pressure in the container 23 and the movement of the cam 27 the circular wall portions 19 will be formed by the fluid pressure and will retain the circular shape shown after the pressure is relieved. The bellows 17 may then be removed from the container 23 and installed permanently in the device of ultimate use.

Variations and modifications may be made within the scope of the claims and portions of the improvements may be used without others.

We claim:

1. An external overpressure resistant bellows comprising a resilient, tubular one-piece body having walls provided with annularly-extending corrugations, said corrugated walls having outer portions comprising narrow, flat, juxtaposed, annular bands, each band constituting substantially a section of a cylinder and being aligned and coaxial with the other bands, and having other annular portions integral with, disposed inside of and connecting adjacent bands, said other portions having a cross section which is substantially circular and normally extends through an arc materially greater than 180 degrees.

2. An external overpressure resistant bellows comprising a resilient, tubular, one-piece body having walls provided with annularly-extending corrugations, the radially outermost portions of said walls having a radial depth substantially equal to the wall thickness, and said walls having annular portions disposed inwardly of and joined to said outermost portions and characterized by a cross section which is substantially circular and extends through an arc materially greater than 180 degrees, said inwardly-disposed portions being free of reverse curvatures.

3. The invention as defined in claim 2 in which said inwardly disposed annular portions are closely juxtaposed and engageable with each other during compression of the bellows effected by an overpressure, said engagement occurring prior to the bellows becoming permanently deformed.

4. An external overpressure resistant bellows comprising a resilient, tubular, one-piece body having annularly-extending corrugations, said corrugations including a series of juxtaposed annular walls, the walls of each of said corrugations being connected together by an inwardly-disposed, curved connector wall portion and being normally and at all times convergent in the direction of the outside of the bellows, said curved connector wall portions comprising part of said corrugations and said corrugations further including at least one flat, annular, outwardly-disposed wall portion constituting a cylindrical section, connecting together adjacent annular walls of said pairs.

5. The method of forming an overpressure resistant bellows from a bellows which has corrugated side walls having a plurality of flat, spaced, coaxial portions lying generally in equispaced radial planes and inner and outer circular connector portions connecting together said flat portions, with the outer connector portions being substantially flat and the inner portions circular, which includes the step of subjecting the exterior of said corrugated walls of the bellows to a fluid pressure greatly in excess of the working pressure of said bellows and simultaneously supporting the ends of the bellows to prevent unrestrained contraction thereof, said excess pressure being sufficient to permanently curve inward the said flat portions of the walls and cause said permanently curved portions to constitute substantially continuations of the curves of the inner circular connector portions.

6. The method of forming an overpressure resistant bellows from a conventional bellows which has corrugated side walls having a plurality of flat, spaced, coaxial portions lying generally in equispaced radial planes and inner and outer circular connector portions connecting together said flat portions, which includes the steps of rolling flat the outer circular connector portions of the bellows, and subjecting the exterior of said corrugated walls of the bellows to a fluid pressure greatly in excess of the working pressure of said conventional bellows and simultaneously movably supporting the ends of the bellows to provide controlled contraction thereof, said excess pressure being sufficient to permanently curve inward the said radial portions of the walls and cause said permanently curved portions to constitute substantially continuations of the curves of the inner circular connector portions.

References Cited in the file of this patent

UNITED STATES PATENTS

| | | |
|---|---|---|
| 398,525 | McCloskey | Feb. 26, 1889 |
| 696,358 | Bailey | Mar. 25, 1902 |
| 783,545 | Rowland | Feb. 28, 1905 |
| 1,570,312 | Mallory | Jan. 19, 1926 |
| 1,705,622 | Mallory | Mar. 19, 1929 |
| 1,745,585 | Scharer | Feb. 4, 1930 |
| 1,823,532 | Clifford | Sept. 15, 1931 |
| 1,854,944 | Lee | Apr. 19, 1932 |
| 2,044,711 | Mantle | June 16, 1936 |
| 2,478,398 | Hopkins | Aug. 9, 1949 |

FOREIGN PATENTS

| | | |
|---|---|---|
| 687,175 | France | Apr. 22, 1930 |